No. 693,658. Patented Feb. 18, 1902.
G. LACZAY.
AUTOMATIC COUPLING FOR RAILWAY CARRIAGES.
(Application filed July 31, 1901.)
(No Model.) 2 Sheets—Sheet 1.
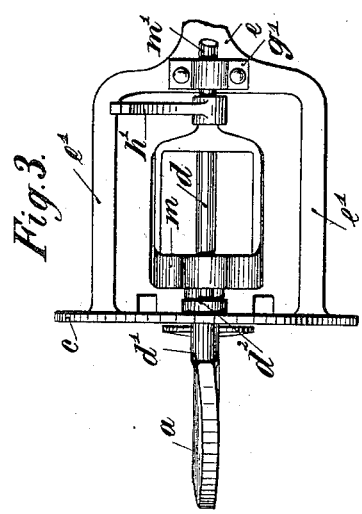
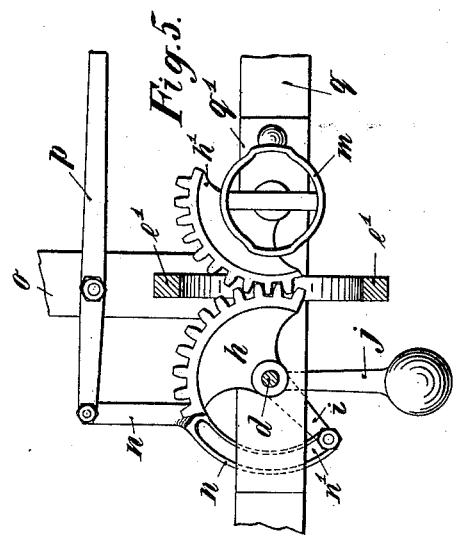
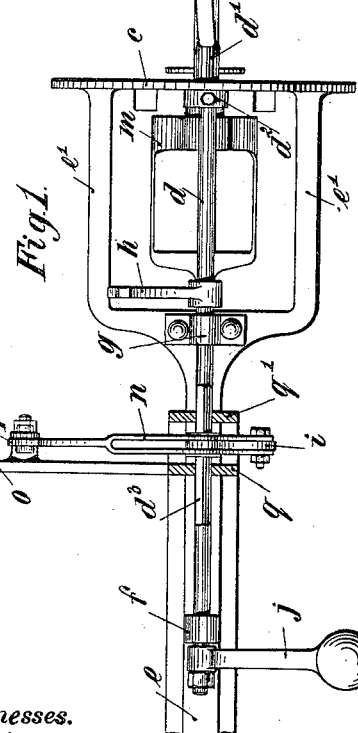
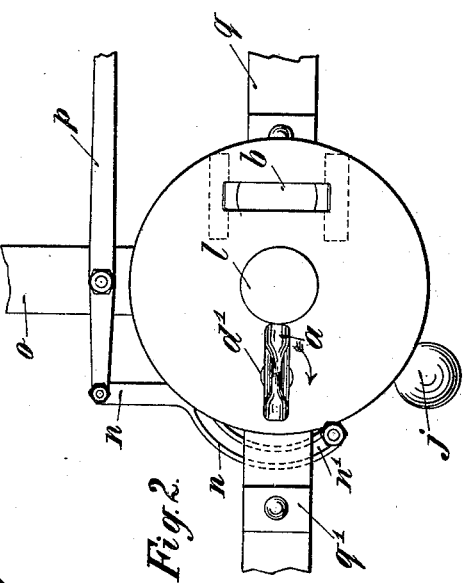
Witnesses.
Jules C. Delauney
Ludwig Flun
Inventor.
Georg Laczay
by B. Singer
Att'y.
THE NORRIS PETERS CO., PHOTO-LITHO., WASHINGTON, D. C.

No. 693,658. Patented Feb. 18, 1902.
G. LACZAY.
AUTOMATIC COUPLING FOR RAILWAY CARRIAGES.
(Application filed July 31, 1901.)
(No Model.) 2 Sheets—Sheet 2.
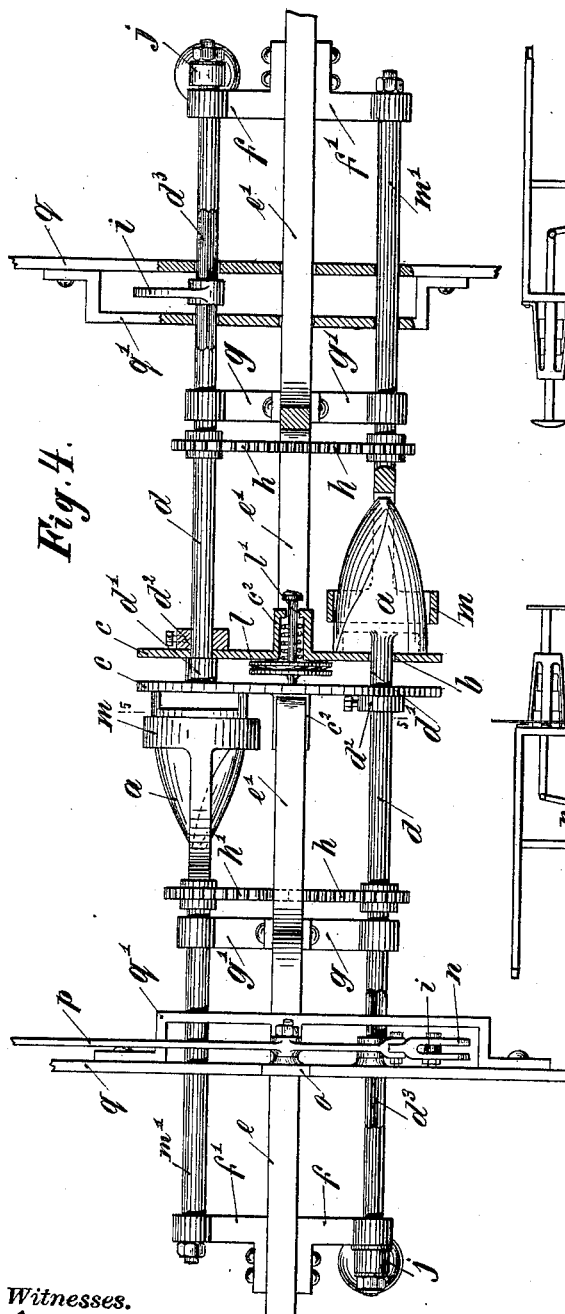
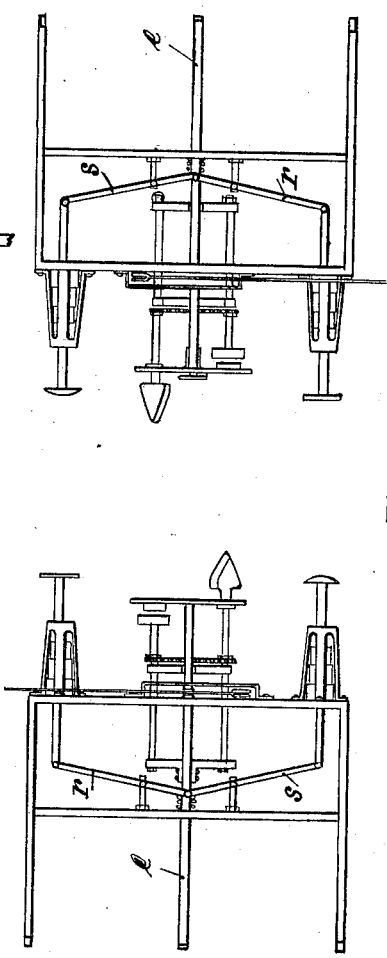
Witnesses.
Jules C. Delauney
Ludwig Flinn
Inventor.
Georg Laczay
by J. J. Singer
Att'y.
THE NORRIS PETERS CO., PHOTO-LITHO., WASHINGTON, D. C.

UNITED STATES PATENT OFFICE.

GEORG LACZAY, OF UJ-KIGYÓS, AUSTRIA-HUNGARY.

AUTOMATIC COUPLING FOR RAILWAY-CARRIAGES.

SPECIFICATION forming part of Letters Patent No. 693,658, dated February 18, 1902.

Application filed July 31, 1901. Serial No. 70,332. (No model.)

*To all whom it may concern:*

Be it known that I, GEORG LACZAY, engineer, of 13 Hosszu-utcza, Uj-Kigyós, in the Empire of Austria-Hungary, have invented a new and useful Improvement in Automatic Couplings for Railway-Carriages, of which the following is a specification.

This invention for improvements in automatic couplings for railway-carriages has for its object to provide a coupling that shall engage automatically when two vehicles are brought together and that can be readily uncoupled from either side of the vehicle.

The coupling consists, essentially, of a projecting arrow-headed draw-rod having a screw-like surface, the draw-head being normally held in a horizontal plane, and of a disk fixed onto the front of the carriage, the disk being provided with a vertical slot corresponding to the size of the draw-head.

The coupling is effected as follows: The point of the draw-head of the one vehicle enters the vertical slot in the disk of the adjacent vehicle when the carriages to be coupled are brought into contact, and in consequence of its screw-like formation the head is rotated by the sides of the slot through an angle of about ninety degrees, in which position it can pass through the slot to the back of the disk, when it is immediately rotated back into its original horizontal position by means of a weight or such like, thus coupling the vehicles securely together.

The uncoupling is effected by hand by means of a suitably-mounted lever or by any other convenient method, by means of which the draw-head is rotated ninety degrees in the opposite direction, and by the removal of one carriage is drawn out of the slot in the disk of the other carriage, after which the draw-head is brought back into its original horizontal position by means of the weight or its equivalent.

A coupling constructed according to this invention is shown on the accompanying drawings, in which—

Figure 1 is a sectional side elevation of the apparatus and of the end of the carriage; Fig. 2, a front view of the same; Fig. 3, an elevation of the coupling from the opposite side to that shown in Fig. 1. Fig. 4 is a sectional plan of two carriages coupled together. Fig. 5 is a section of the apparatus on line 5 5 of Fig. 4. Fig. 6 is a plan of the connection of the apparatus with the ordinary railway-carriage buffers.

The horizontal triangular draw-head $a$, projecting from the end of the carriage, and the disk $c$, fitted onto the carriage to be coupled and provided with a vertical slot $b$ to receive the draw-head $a$, form the chief parts of the apparatus. The draw-head $a$ is carried on a horizontal draw-rod $d$, which rod is mounted in the bearings in brackets $f$ and $g$ and can rotate therein, the brackets being secured to the draw-bar $e$, which is provided with a spring. The rod $d$ passes through a hole in the disk $c$, which is formed with a vertical slot for receiving a similar draw-head $a$, carried on the adjacent vehicle to be coupled. The rod $d$ is thickened on the end $d'$, projecting from the disk to form a shoulder for the purpose of preventing any movement of the draw-head backward during the coupling. Close behind the disk $c$ the rod $d$ is provided with a collar $d^2$, which is fixed to the rod with a set-screw. This collar $d^2$ and the shoulder hold the rod $d$ in position longitudinally. There are besides on the rod $d$ a toothed sector $h$ as well as a lever $i$, a releasing device $m$, and a weighted lever $f$, the object of which will be described later.

The disk $c$ is held by the fork-shaped end $e'$ of the draw-bar $e$. The size of the slot $b$ in this disk is so proportioned that it allows the draw-head $a$ to enter when it has been turned through ninety degrees. The disk $c$ is furthermore provided at the back with a centrally-placed spring-box $c^2$, in which works a buffer $l$, forced outward by a spiral spring $k$. The object of this buffer $l$ is to lessen the stiffness of the coupling and to enable the carriages to be properly stopped on curves. Behind the disk $c$ is placed concentrically with the slot $b$ a releasing device $m$, which is provided with a shaft $m'$, that can rotate horizontally in bearings in brackets $f'$ and $g'$, which are fixed on the draw-bar $e$.

The apparatus $m$ is in the form of a fork or stirrup, with a mouthpiece of greater width than depth, as shown in Fig. 5, the object of which is to effect the uncoupling by rotating the draw-head of the coupled vehicle. Fixed on the horizontal shaft $m'$ is a toothed sector $h'$, which engages in the similar toothed sector $h$ of the rod $d$, so that by turning the rod $d$ the shaft $m'$ is also rotated, and thus the releasing device $m$.

The pin of the lever $i$, fixed on the rod $d$, takes into the arc-shaped slot of a connecting-link $n$ and can slide freely therein. The link $n$ is jointed to a lever $p$, which is mounted on the frame $o$ of the carriage and turns thereon, its outer end projecting from the side of the carriage.

In order that the lever $i$ may not interfere with the longitudinal movement of the shaft $d$ and draw-bar $e$, which passes through an opening in the frame $q$ of the carriage, the part $d^3$ of the rod $d$ is made square in cross-section, and the lever $i$, which is fixed between the frame $q$ and the bracket $q'$, attached thereto, can slide on the rod, its boss having a sliding fit on the part $d^3$.

The manner of working the above-described coupling is as follows: When the vehicles which are to be coupled are brought into contact with one another, the points of the draw-heads $a$ of both carriages are pressed into the slots $b$ in the disks $c$, which stand opposite to them, respectively, in the adjacent vehicles, when in consequence of their screw-like formation they are forced by the edge of the slot to rotate and after turning ninety degrees are pressed completely through the slots $b$. When the back portion of the head $a$ is in position behind the disk $c$, Fig. 4, the rod $d$ and through it the head $a$ are immediately turned back into the horizontal position through the instrumentality of the weighted lever $j$, which was raised simultaneously with the rotation of the draw-head, so that the head $a$ again lies transversely across the slot $b$ in the disk, whereby the carriages are securely connected and automatic uncoupling is impossible. If the vehicles are to be uncoupled, one of the sidewise-projecting levers $p$ is turned and operates the shaft $m'$ through the tooth-wheel segments $h\,h'$, whereby the shaft $m'$, with its releasing device $m$, causes the head $a$ of the coupling on the adjacent vehicle to turn into the vertical position, so that by parting the vehicles the heads $a$ are drawn out of the slots $b$. The uncoupling does not need, however, to be effected in the manner described, but can be done also, especially in passenger-trains, by connecting the rod $d$ with, for instance, a piston-rod by means of a lever, the piston being movable backward and forward in a cylinder, which is to be connected with the train-pipe of the Westinghouse brake, so that to bring about the uncoupling air is admitted into this cylinder through a valve, which air sets the piston in motion and turns the rod $d$, connected to it, ninety degrees. The above-described lever can, however, be arranged differently, so as to turn the shaft $d$ in any desired manner. In such cases the construction of the coupling shown in Fig. 6 is employed if the ordinary buffers are also to be used. The apparatus is in this case so arranged that when the carriages which are to be coupled come into contact the buffers by pressing one against the other push forward the draw-bar $e$, as well as the coupling arrangements fixed on it, by means of the levers $r$ and $s$, which have two arms, and thus connect the carriages. The construction of the coupling apparatus itself is exactly as already described.

What I claim, and desire to secure by Letters Patent of the United States, is—

1. In a device of the character described, the combination with a draw-bar, of a pair of horizontal rods mounted one on each side thereof, a disk carried by one of said rods and engaging said draw-bar, a draw-head, carried by said rod and projecting beyond said disk, said disk having a vertical slot formed therein diametrically opposite said draw-head, a toothed sector carried by each of said rods, said sectors intermeshing whereby both rods are operated in unison, a fork carried by the other of said rods to the rear of said disk and in alinement with the vertical slot therein, said rod carrying the draw-head having a portion thereof square in cross-section, a lever slidably mounted on said square portion, means for operating said lever, and a weight carried by said rod, substantially as described.

2. In a device of the character described, a draw-bar carrying a rod on each side thereof, a disk carried by one of said rods and having a vertical slot therein in alinement with the other of said rods, a triangularly-shaped draw-head carried by the said first-named rod, toothed intermeshing sectors carried by said rods, a fork $m$, carried by the said second-named rod, a lever slidably mounted on said first-named shaft for operating said shaft, a lever carried by the frame, a slotted link connected to said levers, and a weight carried by the first-named rod, substantially as described.

In testimony whereof I affix my signature in presence of two witnesses.

GEORG LACZAY.

Witnesses:
JOSEPH WIEKMANN,
ÖDÖN MOHISRY.